(12) United States Patent
Stiglic

(10) Patent No.: US 8,151,072 B2
(45) Date of Patent: Apr. 3, 2012

(54) METHOD FOR LOCKING NON VOLATILE MEMORY WORDS IN AN ELECTRONIC DEVICE FITTED WITH RF COMMUNICATION MEANS

(75) Inventor: Maksimilijan Stiglic, Maribor (SI)

(73) Assignee: EM Microelectronic-Marin SA, Marin (ES)

( * ) Notice: Subject to any disclaimer, the term of this patent is extended or adjusted under 35 U.S.C. 154(b) by 986 days.

(21) Appl. No.: 12/043,219

(22) Filed: Mar. 6, 2008

(65) Prior Publication Data

US 2008/0229042 A1    Sep. 18, 2008

(30) Foreign Application Priority Data

Mar. 13, 2007    (EP) .................................... 07104052

(51) Int. Cl.
*G06F 12/00* (2006.01)
*G06F 13/00* (2006.01)

(52) U.S. Cl. ......... 711/163; 711/100; 711/103; 711/154

(58) Field of Classification Search .................. 711/100, 711/103, 154, 163

See application file for complete search history.

(56) References Cited

U.S. PATENT DOCUMENTS

| 5,568,634 | A | * | 10/1996 | Gordons | 711/170 |
| 5,732,241 | A | * | 3/1998 | Chan | 711/131 |
| 5,802,583 | A | * | 9/1998 | Yeager et al. | 711/152 |
| 6,034,889 | A | * | 3/2000 | Mani et al. | 365/185.04 |
| 6,035,401 | A | | 3/2000 | Dalvi et al. | |
| 7,398,554 | B1 | * | 7/2008 | Falik et al. | 726/23 |

FOREIGN PATENT DOCUMENTS

| EP | 0 304 348 B1 | 2/1989 |
| FR | 2 770 327 | 4/1999 |

OTHER PUBLICATIONS

European Search Report issued in corresponding application No. EP 07 10 4052, completed Aug. 6, 2007.

* cited by examiner

*Primary Examiner* — Tuan V. Thai
(74) *Attorney, Agent, or Firm* — Griffin & Szipl, P.C.

(57) ABSTRACT

The electronic device, in particular a transponder, includes a non volatile memory (EEPROM) having a plurality of words 1 to N whose read and/or write access can be locked. The protection register (22) is formed of two protection words A and B these two protection words are alternately active and inactive during the successive locking of words 1 to N of the programmable memory (16). The state of the protection register is defined by the active word. An initially active word is not deleted until the content thereof has been copied into the inactive word. Once the content has been altered in accordance with the lock command, the initially inactive word becomes the active word of the protection register.

4 Claims, 2 Drawing Sheets

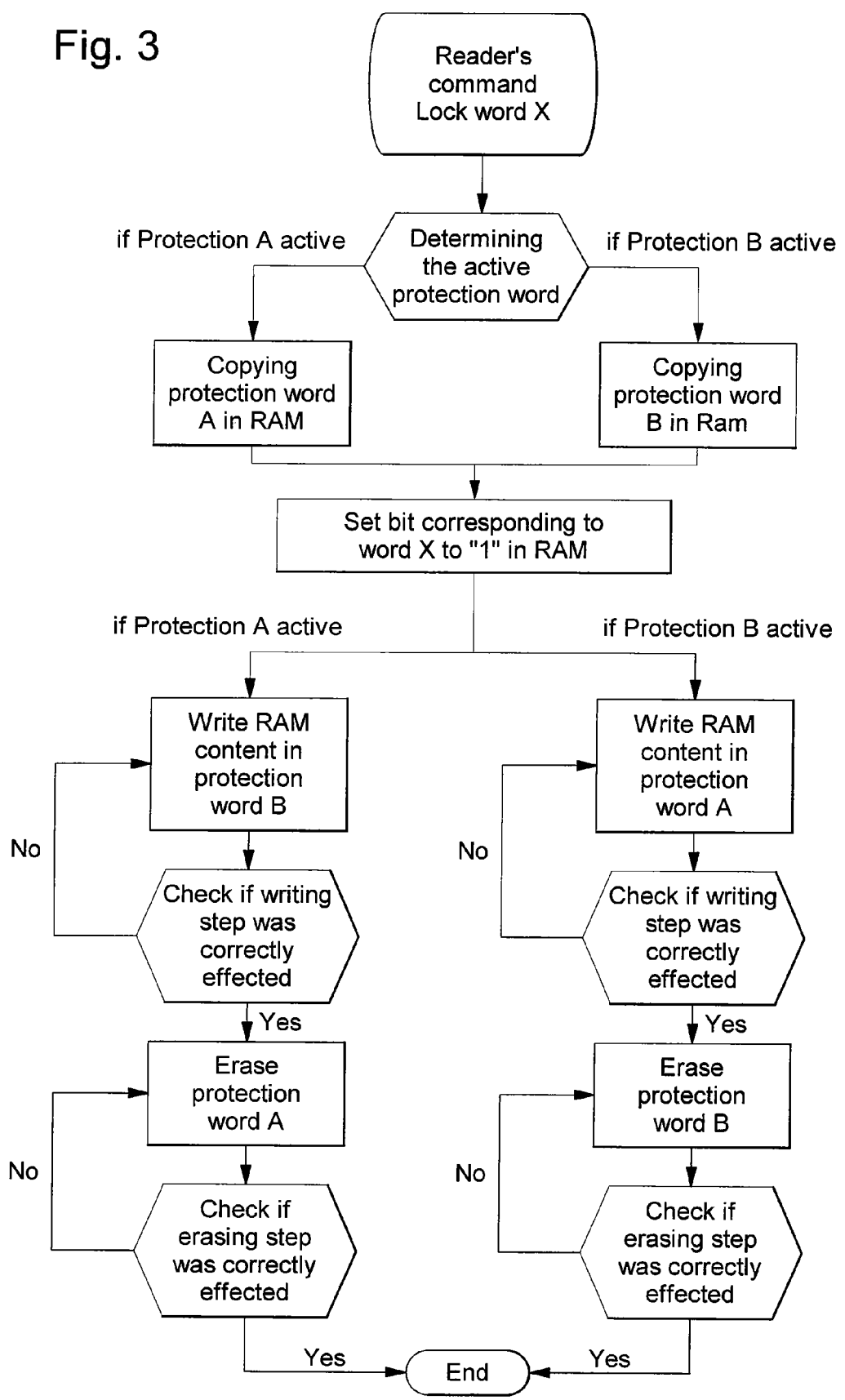

METHOD FOR LOCKING NON VOLATILE MEMORY WORDS IN AN ELECTRONIC DEVICE FITTED WITH RF COMMUNICATION MEANS This application claims priority from European Patent Application No. 07104052.1 filed Mar. 13, 2007, the entire disclosure of which is incorporated herein by reference.

FIELD OF THE INVENTION

The invention concerns a method for locking words of a non-volatile memory in an electronic device fitted with RF communication means. In particular, the electronic device is a transponder. The invention also concerns an electronic device arranged for operating in accordance with the locking method of the invention. The non-volatile memory is a programmable memory of the EEPROM type. It is generally structured in several parts which can be accessed separately either in a write mode or a read mode. These parts are formed of several bits. Each part of the memory is generally defined by a sequence of bits that is also called a "word". Hereafter, the term "word" will be used to designate a distinct part of the memory relative to the read and/or write access.

BACKGROUND OF THE INVENTION

Transponders are known that are fitted with a non-volatile memory and structured in a plurality of words. One type of data is generally attributed to each word used. Some words may be reserved for the transponder manufacturers, others for a national distributor and others still for the end client or user. In order to protect either the content of some words, or the read access without authorisation, a data protection register is provided. This register is generally formed by a protective word having a plurality of bits corresponding to a plurality of words, access to which is locked individually. The logic circuit is arranged such that it is possible to lock access to any word by changing the logic state of the corresponding bit in the protective word. For several applications, locking is definitive, i.e. irreversible, particularly for security reasons. Thus, it is necessary to ensure that the content of the protective word can not be altered as regards the bits corresponding to the definitively locked words.

The conventional programmable word write method of an EEPROM memory generally includes a preliminary step of deleting the content of the word prior to writing the new content. Two situations can lead to a loss of the correct protection word content. First of all, an error during processing of the protection word content can occur such that the content after writing is erroneous. Secondly, the transponder power supply or the lock procedure of a given word may be interrupted just after the protection word content has been deleted and before the new consequently modified word has been written into the protection word. This second situation, which can occur by chance or deliberately, raises a serious memory data protection problem since all of the words of the memory have free access. It is an object of the present invention to solve the aforementioned data protection problem for a non-volatile memory.

SUMMARY OF THE INVENTION

The invention concerns an electronic device including a logic unit, a non-volatile memory and an electromagnetic communication antenna, the non-volatile memory including a plurality of distinct words whose access can be individually locked. This electronic device includes a protection register of said plurality of words, which is formed of two protection words each having a plurality of lock bits respectively corresponding to the plurality of words, the two protection words being alternately active and inactive during the successive locking of the words of said plurality of words, the active protection word defining the state of said protection register. Any word is locked if the corresponding lock bit of the protection register is in a first logic state while its access is free if this corresponding lock bit is in a second logic state, each new lock of any word generating writing of the new resultant protection word in the inactive protection word, which then becomes the active protection word of said protection register.

The invention also concerns a word lock method for a non-volatile memory of an electronic device as defined above, characterized in that it includes the following steps for locking any word X:

A) Determining the active protection word, hereafter the "first protection word", of the protection register;

B) Copying the content of this first protection word in a random access memory or a data processing register;

C) Setting the bit correspond to said word X in said random access memory or in said data processing register, in the first logic state ("1") and then writing the resultant content of the random access memory or data processing register in the inactive protection word, hereafter the "second protection word".

According to a preferred implementation, after step C), the method checks whether the write operation in the second protection word has been correctly carried out and, if not, either the whole of step C) is repeated, or the content of said random access memory or said data processing register is rewritten in said second protection word; until this write step has been correctly completed. After this last step said second protection word becomes the active protection word.

The invention also concerns a word lock method for a non-volatile memory of an electronic device as defined above, characterized in that it includes the following steps for locking any word X:

A) Determining the active protection word, hereafter the "first protection word", of the protection register, B) Copying the content of said first protection word into the inactive protection word, hereafter the "second protection word";

C) Setting the lock bit of said second protection word corresponding to said word X in the first logic state.

In a preferred variant of this latter method, a check is made as to whether step B) was correctly carried out and, if not, step B) is repeated until it is correctly carried out. A check could also be made as to whether step C) was correctly carried out and, if not, step C) is repeated until the lock bit is in the first logic state.

BRIEF DESCRIPTION OF THE DRAWINGS

The description of the implementations of the method according to the invention and one embodiment of an electronic device according to the invention is given hereafter with reference to the drawings, given by way of non-limiting example, in which:

FIG. 3 is a diagram representative of one implementation of the method of the invention.

DETAILED DESCRIPTION

Figure 1:
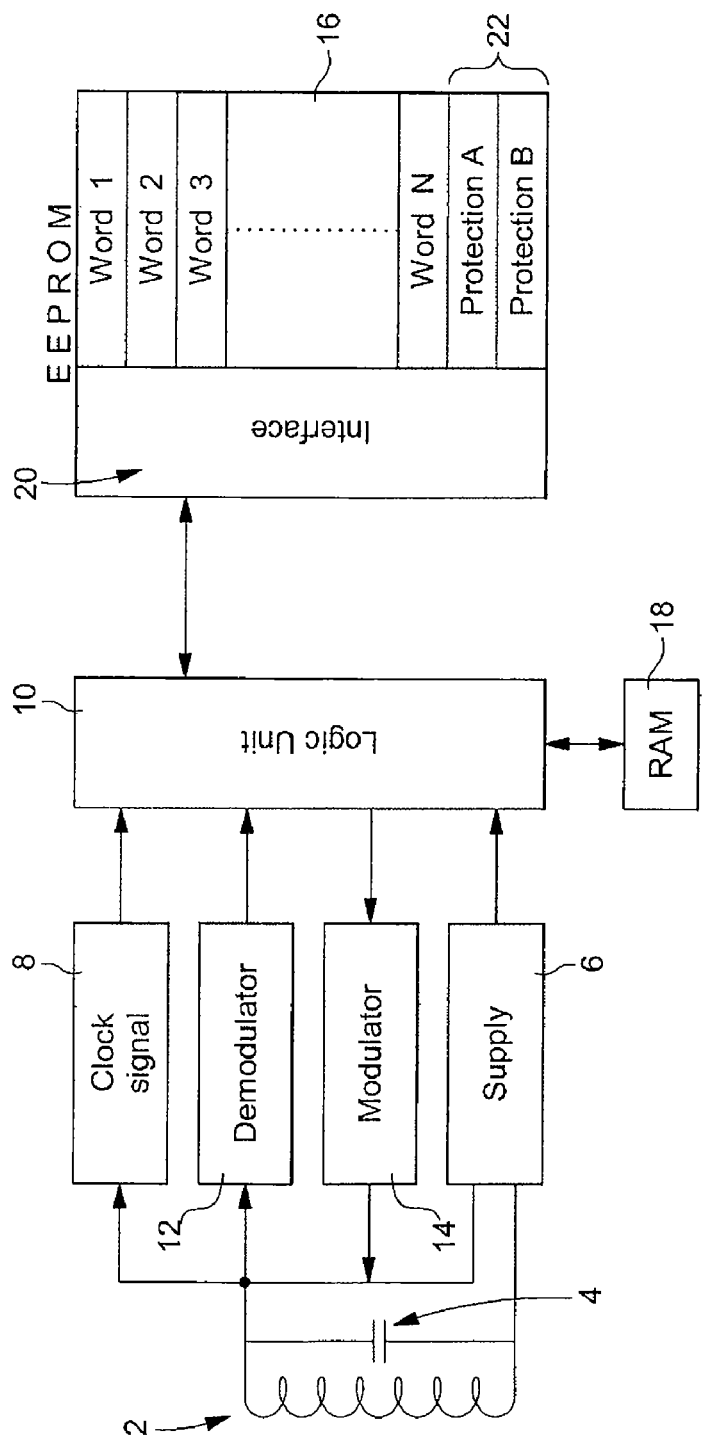
FIG. 1 is a bloc diagram of a transponder according to the invention.
Figure 2:
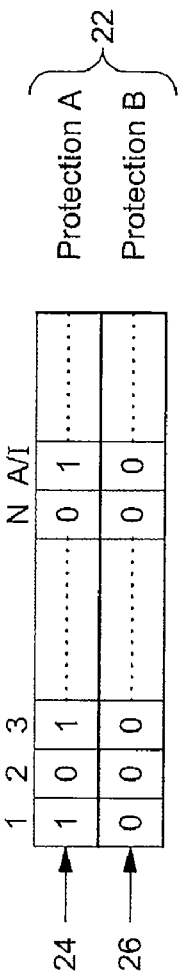
FIG. 2 shows a protection register of the memory of the transponder of FIG. 1.

With reference to FIGS. 1 and 2, a transponder according to the invention will be described below. In a conventional manner, this transponder includes an electromagnetic communication antenna 2 arranged in parallel with an input capacitance 4. The transponder is of the passive type. It includes a power supply unit 6 for powering the transponder by rectifying the electromagnetic signal received by antenna 2. It includes means 8 for extracting a clock signal from the received electromagnetic signal. This clock signal is supplied to the central logic unit 10. The transponder further includes a demodulator 12 for the received signal which supplies the logic unit with a digital signal defining the data received by the transponder. In order to be able to reply to an interrogation signal or to an excitation signal, the transponder also includes a modulator 14.

The transponder further includes a programmable EEPROM memory 16 connected to logic unit 10 and a random access memory (RAM) 18 associated with the logic unit. In a conventional manner, memory 16 includes an input interface 20 and a plurality of words 1 to N in which different types of data can be written. Access to each programmable word 1 to N of non-volatile memory 16 can be locked. Locking access consists in this case of preventing the content of any selected word from being altered. In order to do this, memory 16 includes a protection register 22 arranged for individually locking each programmable word of said plurality of words 1 to N. The protection register includes a plurality of lock bits respectively corresponding to the plurality of programmable words 1 to N. Any programmable word is locked if the corresponding lock bit of the protection register is in a first given logic state ("1"), whereas access thereto is free if the corresponding lock bit is in a second logic state ("0").

According to the invention, protection register 22 is formed of two protection words A and B each having a plurality of lock bits respectively corresponding to the plurality of words 1 to N. The two protection words are alternately active and inactive during the successive locking of the words of the plurality of words. The state of the protection register is defined by the active protection word. Thus, each new lock of any programmable word generates writing of the resulting new protection word in the inactive protection word, which then becomes the active protection word of protection register 22. This will be described more precisely below.

In the variant described in FIG. 2, each protection word 24, respectively 26 includes a state bit A/I, which indicates whether the protection word is active or inactive, one being inactive when the other is active. In FIG. 2, the first protection word 24 or A is active whereas protection word 26 or B is inactive. As shown in FIG. 2, all of the bits of the plurality of lock bits 1 to N of inactive protection word 26 are in the second logic state "0" prior to writing a new protection word in this inactive protection word during a lock procedure of at least one word 1 to N of memory 16.

With reference to FIG. 3, we will describe a first implementation of the method of lock words 1 to N of transponder memory 16 described above with reference to FIGS. 1 and 2.

A command from a reader received by the transponder generates locking of a word X in the transponder. "Reader" means a device able to interrogate the transponder. In this case, it is a transceiver. When the transponder receives a lock command from the reader, it first of all determines which is the active protection word. In the transponder variant described previously, determination occurs by reading the state bit A/I of at least one of the two protection words A and B. Indeed, it is possible that only one of the two protection words has a state bit. In another variant, where not state bits are provided in the two protection words A and B, determination of the active protection word is achieved by determining which one of the two protection words has the most bits in the first logic state, i.e. in the example described the logic state "1". It will be noted that other possibilities can be envisaged for determining the active protection word. In a simplified variant, it is possible to detect only whether protection word A includes lock bits in the first logic state. If so, it is then considered to be the active protection word. If not, it is considered to be the inactive protection word. This simplified variant is possible only if the inactive protection word is deleted after a lock process of at least one programmable word.

Once the active protection word has been determined, its content is copied into a RAM memory or into any data processing register. Then, the bit corresponding to word X is set in the RAM memory or in the data processing register, in the first logic state "1". The resulting content of the RAM memory or the data processing register is then written in the inactive protection word. Next, there is a step of checking the preceding write procedure which checks that the write operation has been correctly carried out in the inactive protection word. If not, at least the preceding step is repeated, i.e., writing the content of the RAM memory or the data processing register into the initially inactive protection word. In a variant, the earlier steps could also be repeated, namely copying the active protection word into the RAM memory and also changing the state of the bit corresponding to the word X whose read or write access is locked. In yet another variant, one can only check whether the content in the RAM memory is correct before repeating the step of writing the content into the initially inactive protection word.

Next, the content of the initially active protection word, which has become the inactive protection word after the new protection word has been successfully written, is deleted, also locking access to word X, in the initially inactive protection word, which, after the word X lock process described here, has become the active protection word of the protection register.

In the method according to the invention described with reference to FIG. 3, a check is carried out as to whether the deletion step has been successfully carried out. If not, the newly inactive protection word is again deleted. This thus completes the lock process of word X in the transponder according to the invention. Thus, the two protection words of the protection register are alternately active and inactive during the successive locking of words of the non-volatile EEPROM transponder memory.

In a second implementation of the lock method according to the invention, after having determined the active protection word, the content of the active protection word is directly copied into the inactive protection word and then the lock bit corresponding to the word to be protected is set in the first logic state "1". In an advantageous variant, after copying the content of the active protection word into the inactive protection word, a check is carried out as to whether this write step has been correctly carried out and, if not, this write step is repeated until it is successfully completed. Then, the content of the initially active protection word, which then becomes the inactive protection word, can be deleted.

This second implementation of the method of the invention thus differs from the first essentially in that there is no RAM memory or data processing register associated with the logic unit used for writing the new protection word in the initially inactive protection word of the protection register.

It will be noted finally that the inactive protection word can be deleted either at the start of the lock process of any word X or directly at the end of said process when the content of the active protection word has been checked. The method according to the invention thus guarantees that the protection register of a transponder memory is reliable in all circumstances. It is impossible to lose the lock state of the memory of an electronic device according to the invention. If the lock process is interrupted for any reason or if the supply field is lost during the process, the logic state of the memory word lock bits is never lost. In fact, there is no deletion until the new protection word has been successfully written. If a problem occurs during a lock command for a given word, one can always return to the preceding state and restart locking of the given word. Thus, if a user has access to a certain part of the memory that he can programme and then lock, it is impossible for such user to be able to alter the previous protection state of other parts of the memory to which he is not authorised to have read and/or write access.

What is claimed is:

1. An electronic device including:
   (i) a logic unit;
   (ii) a non volatile memory, wherein said non volatile memory includes a plurality of distinct words whose access can be individually locked;
   (iii) an electromagnetic communication antenna; and
   (iv) a protection register of said plurality of words, wherein the protection register is formed of two protection words each having a plurality of lock bits respectively corresponding to the plurality of words, wherein the two protection words are alternately active and inactive during a successive locking of the words of said plurality of words, wherein the active protection word defines the state of said protection register, wherein any word is locked if the corresponding lock bit of said protection register is in a first logic state whereas access thereto is free if said corresponding lock bit is in a second logic state, wherein each new locking of one word of said plurality of words generates writing of a resulting new protection word in the inactive protection word which then becomes the active protection word of said protection register.

2. The electronic device according to claim 1, wherein all the bits of said plurality of inactive word lock bits are set in the second logic state before said new protection word is written in said inactive protection word.

3. The electronic device according to claim 1, wherein, when a new protection word is generated to lock said any word, the content of said active protection word is transferred into a RAM memory or a data processing register where the active bit corresponding to said any word is then set in said first logic state, the content of said RAM memory or said data processing register then being written in the inactive protection word, which then becomes the active protection word.

4. The electronic device according to claim 1, wherein at least one of the two protection words includes a state bit that indicates whether said word is active or inactive, one word being inactive when the other is active.

* * * * *